No Printed Specification Available
6968X
E. Snow.
Silk Reel.
Patented May 16, 1832.
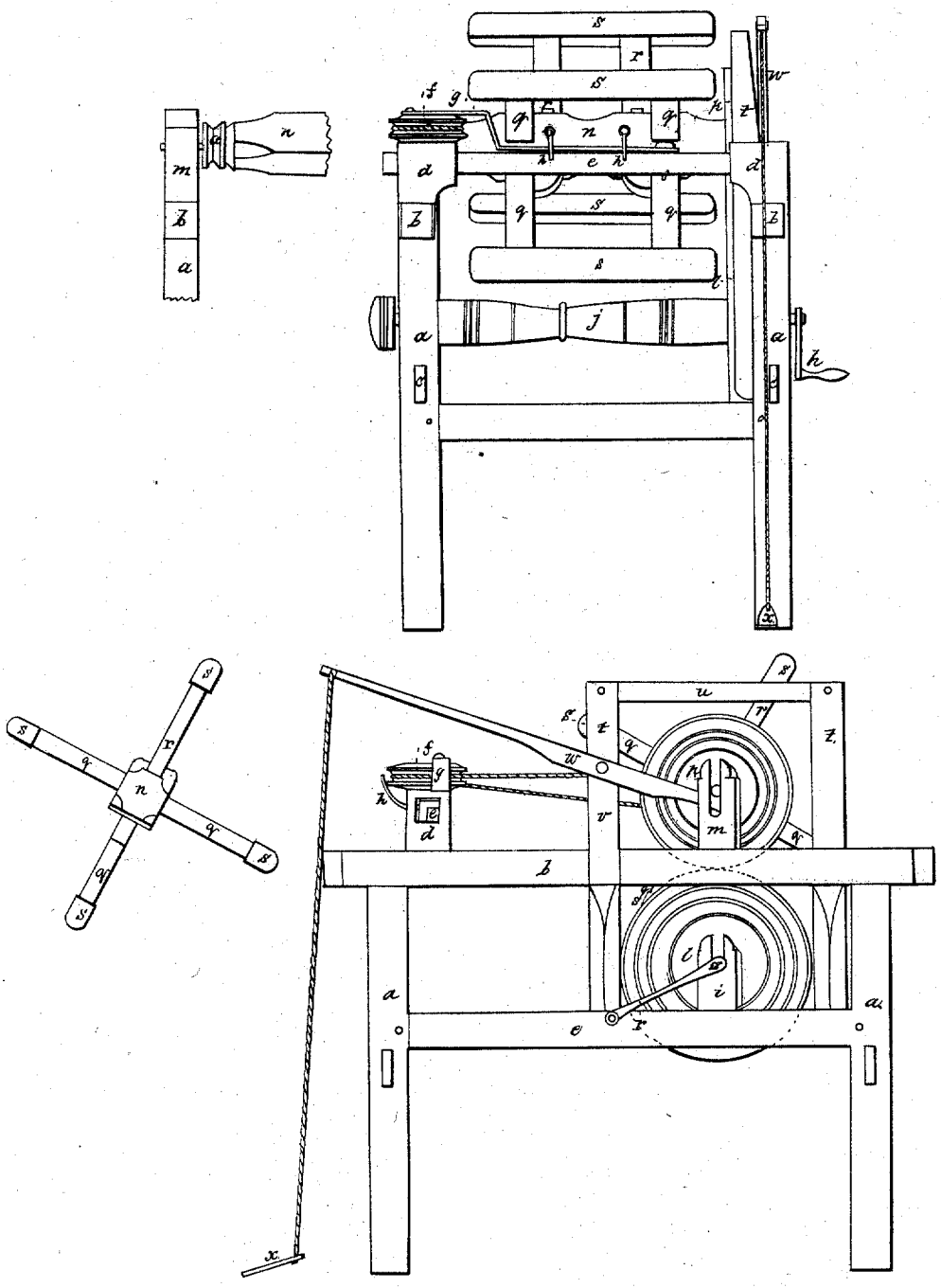
N. PETERS, PHOTO-LITHOGRAPHER, WASHINGTON, D. C.

6968X May 16 1832 [illegible]

Eliphalet Snow

Letters Patent

The Schedule referred to in these Letters Patent and making part of
the same containing a description in the words of the said Eliphalet Snow
himself of his improvement in the machine called a Silk reel for reeling
Silk from Cocoons.

The frame to which said reel is attached is composed of
four posts of about two feet in length framed into two plates about four feet in
length with two girts of about two feet in length which may be of joist three
inches square to one end of said frame a trough of about twenty inches in
length is affixed to the posts and girt.

Two traverse posts of about two inches in length framed
into the two plates with a mortise through them with a traverse bar of about
twenty two inches in length passing through said mortise with a traverse
Pulley about 4 inches diameter attached to the top of the traverse post with a
[illegible] and traverse guide made of brass or wire bent or curved about 9 inches
in length with one end attached to a traverse pulley with a small screw
with the other end fastened with a screw to traverse bar. Two traverse wires
about 4 four inches in length fastened in said Traverse Bar about 6 inches
apart two bearings about 6 inches in length framed into the under side of
said plates with a [illegible] shaft passing at each end through the bearings
with a crank or Pulley attached to the end of said [illegible] shaft with a Pulley
on said [illegible] shaft the inside of one of the bearings about 2[illegible] inches in [illegible]
[illegible] the circumference of said Pulley to be covered with list or woollen
cloth. Two reel posts about 2 inches in length framed into the top of the
plates. A reel shaft about 22 inches in length and two inches square with
[illegible] in each end of said shaft to [illegible] in said reel posts with a [illegible]
at one end of said reel shaft for a [illegible], with a pulley at the other end of
said shaft about [illegible] inches in diameter the circumference of said Pulley to be
covered with list or woollen cloth, [illegible] standing reel arms 14 inches in
length and two [illegible] arms about [illegible] inches in length with a [illegible] or

6968X the end by the Shaft with keys, on the other side of said Shaft four reel heads about 4 inches in length framed in the ends of the reel arms Two Stop Posts about Nine inches in length fastened or framed to the plate on each side of the reel Pully with a Bar fastened to the tops of the Stop Posts the under side of said Bar to be covered with list or woollen Cloth. A Fulcrum post about 4 inches in length fastened or framed to the outside of the plate about 6 inches from the reel post. A lever about 2 feet in length with the end attached to the Reel Shaft with a pin through said lever about 6 inches from the end made fast to the fulcrum Post.

A treadle made fast to end of said lever by means of a cord and the other end of said Treadle made fast to the floor by a Hinge (The before mentioned line Shaft may be extended from 3 feet to 20 or 30 feet in length so as to attach and put in motion 2.3.4 or more reels with the same power)

The reel may be put in motion either by hand, water, steam or Horse Power applied to the crank or pully attached to the end of the line shaft. The cocoons are to be placed in the trough and scalded or steamed with hot water by means of a lead or other pipe with one end placed in a Cauldron or pot of boiling water the top of the pot or Cauldron made tight with a cover and the other end of the pipe in the trough containing Cocoons which will steam and keep the Cocoons warm and fit for Reeling) and when the Reel is thus put in motion one Female can with great ease manage and tend a Reel. Whenever the operator wishes to retard or stop the motion of the Reel it can be done by the foot upon the treadle When the Reel is filled with silk it must remain on the Reel till it is perfectly dried then by removing the [illegible] keys which pass through the two slide arms of the Reel the arms will fall back and the silk or skein may then be removed from the Reel with ease and without injury. Dated 22nd Day of November 1831 Eliphalet Snow Witnesses
Oliver Brigham
John Baldwin

[8 [illegible]

(Patented March 16, 1832)